US008141072B2

(12) United States Patent
Garrett et al.

(10) Patent No.: US 8,141,072 B2
(45) Date of Patent: Mar. 20, 2012

(54) CUSTOMIZED SOFTWARE DOCUMENTATION BASED ON ACTUAL CONFIGURATION VALUES

(75) Inventors: Tricia Y. Garrett, Raleigh, NC (US); Jennifer Heins, Cary, NC (US); John R. Hind, Raleigh, NC (US); Lee A. Kowalski, Gloucester, MA (US); Robert E. Moore, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 11/866,797

(22) Filed: Oct. 3, 2007

(65) Prior Publication Data

US 2009/0094595 A1 Apr. 9, 2009

(51) Int. Cl.
*G06F 9/44* (2006.01)

(52) U.S. Cl. ........................................ 717/174

(58) Field of Classification Search .................. 717/174, 717/705

See application file for complete search history.

(56) References Cited

U.S. PATENT DOCUMENTS

| | | | | |
|---|---|---|---|---|
| 6,151,023 | A * | 11/2000 | Chari | 715/854 |
| 2005/0154986 | A1* | 7/2005 | Bartek et al. | 715/714 |
| 2007/0101345 | A1* | 5/2007 | Takagi | 719/321 |
| 2008/0276230 | A1 | 11/2008 | Chang et al. | |

OTHER PUBLICATIONS

"Apache ANT(TM) 1.8.2 Manual" http://ant.apache.org/manual/cover.html, Dec. 27, 2010.

J. Clark et al. "XML Path Language (XPATH) Version 1.0" http://www.w3.orf/TR/xpath, 1999.

S. Srivastava et al, "Enable a Help System Within the Integrated Solutions Console", http://www.ibm.com/developerworks/autonomic/library/ac-enable/, IBM Developerworks, May 4, 2004, pp. 1-10.

"AJAX", https://developer.mozilla.org/en/AJAX, Mozilla Developer Network, 2011.

T. O'Reilly, "Developerworks Podcast Interviews With Me", http://radar.oreilly.com/2007/01/developerworks-podcast-intervi.html, Jan. 13, 2007.

* cited by examiner

*Primary Examiner* — Philip Wang
(74) *Attorney, Agent, or Firm* — Law Office of Jim Boice

(57) ABSTRACT

A method for customizing end-user or administrative software documentation such as installation instructions is provided. A software provider first collects computer system information for multiple computer sub-systems used by a customer. The collected computer system information comprises sub-system descriptions of each of the multiple computer sub-systems, software descriptions of all software that is currently residing in each of the multiple computer sub-systems, and hardware descriptions of all hardware that are allocated to each of the multiple computer sub-systems. The software provider then receives, from the customer, the name of new software that is to be installed in a user-selected computer sub-system. Based on the collected computer system information, the software provider determines which specific device in the user-selected computer sub-system should have the new software installed. At run time, variables in the installation instructions are replaced with a device's name.

15 Claims, 3 Drawing Sheets

CUSTOMIZED SOFTWARE DOCUMENTATION BASED ON ACTUAL CONFIGURATION VALUES

BACKGROUND OF THE INVENTION

The present disclosure relates to the field of computers, and specifically to software. Still more specifically, the present disclosure relates to software documentation for end-users and administrative tasks such as software installation.

Administrative tasks such as software installation may be a tedious and confusing process. This tedium and confusion is exacerbated when a user must pore through extensive documentation and instructions, which may or may not be relevant to the software or the environment the software is being used in.

BRIEF SUMMARY OF THE INVENTION

A method for customizing software product documentation, such as installation instructions, is provided herein. A software provider first collects computer system information for multiple computer sub-systems used by a customer. The collected computer system information includes sub-system descriptions of each of the multiple computer sub-systems, software descriptions of all software that is currently residing in each of the multiple computer sub-systems, and hardware descriptions of all hardware that are allocated to each of the multiple computer sub-systems. The software provider then receives, from the customer, the name of new software that is to be managed (e.g., installed) in a user-selected computer sub-system. Based on the collected computer system information, the software provider determines which specific device in the user-selected computer sub-system should have the new software maintained/installed. At run time, variables in the administration/installation instructions are replaced with a device's name, and the instructions are filtered such that the user is presented with only germane instructions that have been customized for managing/installing the selected new software.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
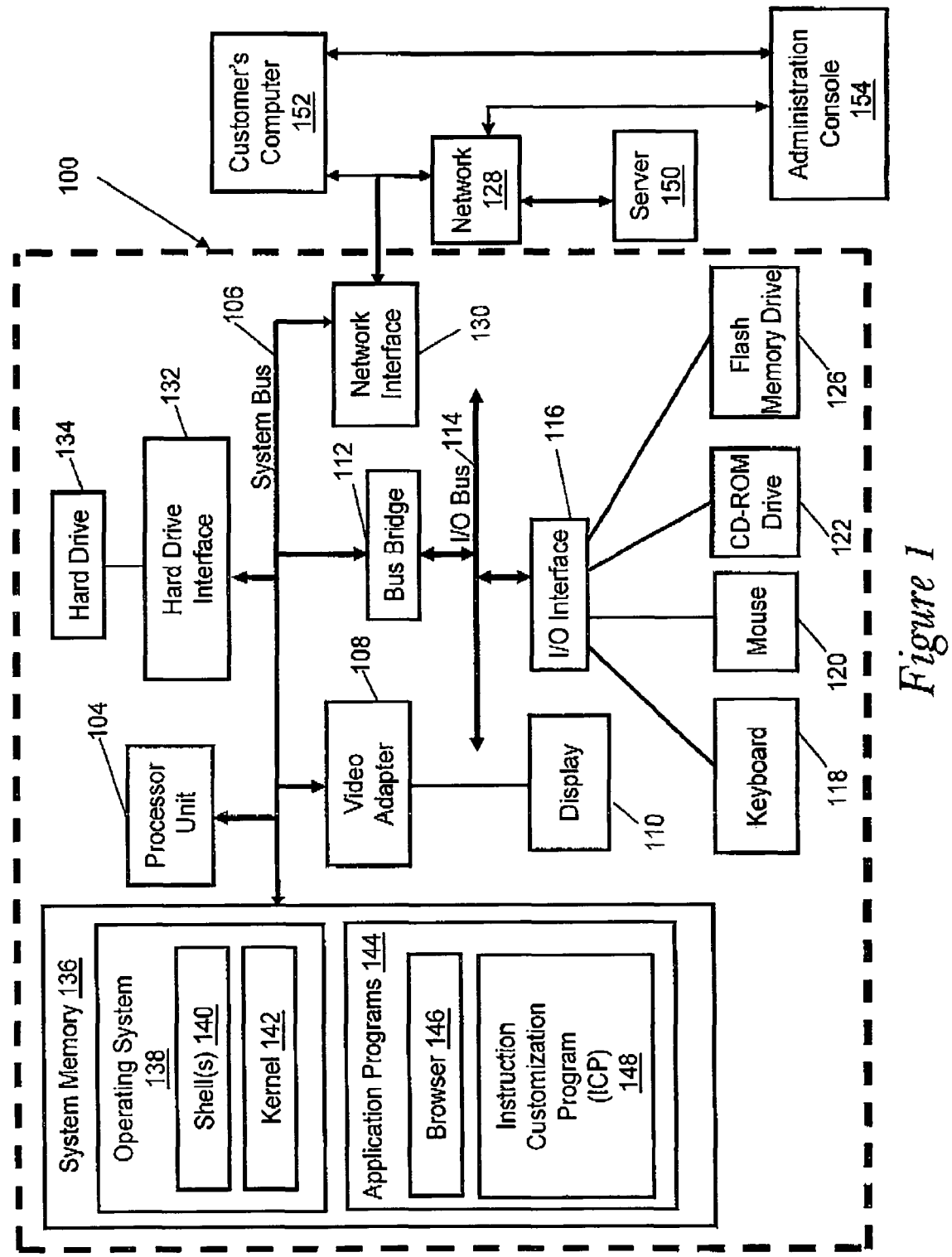
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 is used by a software provider, which provides software, updates, service and/or support to a customer's computer 152. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 and the customer's computer 152 via a network 128 using a network interface 130, which is coupled to system bus 106. The customized instructions described below are provided to the customer's computer 152 by computer 100 (which may be operated by a software supplier/manager/updater service). The administration console 154 monitors which devices and software have been selected for software installation/management. Network 128 may be an external network such as the Internet, or an internal network such as an Ethernet or a Virtual Private Network (VPN). Server 150, customer's computer 152 and/or administration console 154 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an Instruction Customization Program (ICP) 148. ICP 148 performs the functions described below in FIGS. 2-3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
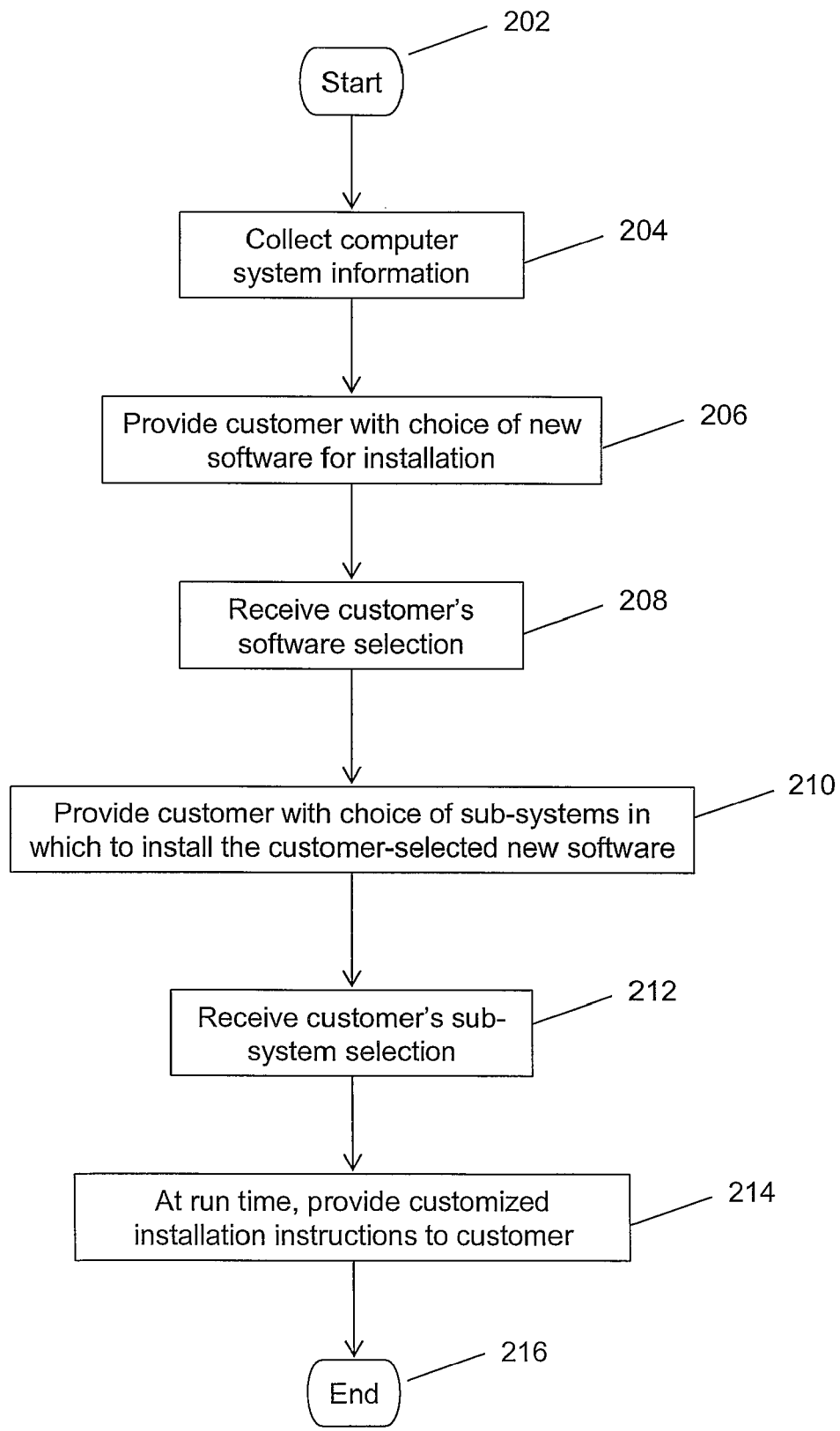
FIG. 2 is a high-level flow-chart of exemplary steps taken to customize software installation instructions for a customer to read.

With reference now to FIG. 2, a flow-chart of exemplary steps taken to customize instructions is presented. Note that the "instructions" being customized are not computer-executable instructions, but rather are human language instructions utilized by a customer to install, maintain, update, or otherwise manage software or hardware that is provided to the customer's computer 152 (depicted in FIG. 1). Thus, the customer may see a customized instruction such as "Install Program A in Server A". This instruction is not computer executable, but rather provides the customer with guideline instructions for installing "Program A" onto "Server A." In a preferred embodiment, the customized instruction provides more direction than the simple instruction to "Install Program A in Server B," but rather provides a detailed step-by-step set of instructions for performing this installation task. In one embodiment, instead of providing the customer with only written instructions for the customer, these instructions may include links to webpages, hot-links to macros, or any other automatic or semi-automatic aid to the installation task.

Figure 3:
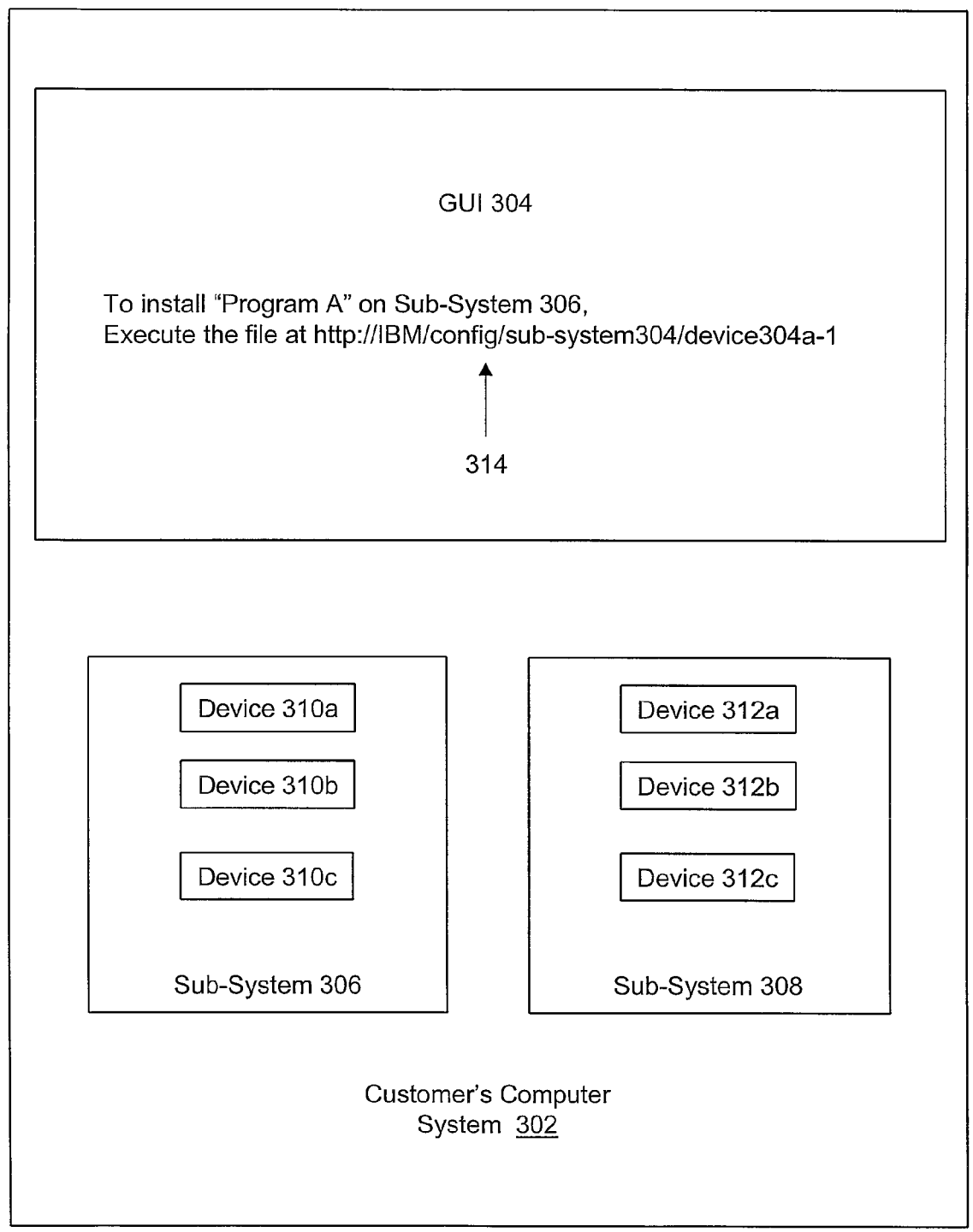
FIG. 3 presents additional detail of the customer's computer system.

Still referring to FIG. 2, after initiator block 202, which may be initiated by a customer deciding to install or otherwise manage software or hardware in the customer's computer system, a software service (using a computer such as computer 100 shown above in FIG. 1) collects computer system information (block 204) about the customer's computer system (e.g., customer's computer 152 shown in FIG. 1). This data may include the types of software and hardware used in the customer's computer system, the names given (either initially by a vendor or later by the customer) to each piece of software and/or hardware, and a description of each subsystem in the customer's computer system. For example, as shown in FIG. 3, a customer's computer system 302 (analogous to customer's computer 152 shown in FIG. 1) is made up of multiple computer sub-systems, shown in an exemplary manner as sub-system 306 and sub-system 308. Within each sub-system are multiple devices (e.g., devices 310a-c and devices 312a-c for respective sub-systems 306 and 308). Examples of such devices are servers, personal computers, storage devices, memories, processors, busses, networks, etc. Each device may or may not be Operating System (OS)

specific/dependent. Each device may or may not be authorized to run a particular software application.

Returning to FIG. 2, after the software service has collected information about the customer's computer system, the software service provides the customer with a choice of options, including the exemplary choice of which software the customer would like to install (block 206). This selection may be provided in a Graphical User Interface (GUI), which allows the customer to view options that are available to him for software (and/or hardware) management. The software service receives the customer's selection (block 208).

Thus, returning to FIG. 3, assume for exemplary purposes that sub-system 306 is for the customer's accounting department, while sub-system 308 is for the customer's payroll department. (These examples are illustrative only. The sub-systems may be for different clients of the customer, different operating systems, or any other business or architecture division created by the customer.) The customer may know that he wants "Program A" installed in his payroll department (sub-system 308). Using the present invention, the customer does not need to know which device (e.g., which server) actually should install "Program A." Because of the system information collected earlier, the software service knows that this program, if selected, is to be installed on device 312a. If the user has selected a program that is not OS-compatible or otherwise not available for that customer and/or that sub-system (e.g., is not authorized for financial, security or other reasons), the software service can either send the customer an error message, or can automatically or semi-automatically (with a prompt to the customer) provide an alternate program that is authorized and compatible with the sub-system in which the customer wants to install the program. Alternatively, the software service can automatically or semi-automatically install the selected program on another sub-system that the software service has deemed appropriate based on the earlier collected system information.

Returning now to FIG. 2, the software service provides the customer with options for which sub-system is to receive the new software (block 210). The customer sends the software service his selection (block 212). Note that in an alternative embodiment, the administration console 154 shown in FIG. 1 can create a rule that identifies devices within different sub-systems of the customer's computer as being functionally related. That is, one server may be for creating paychecks while another server is for tracking vacation time while another server is for tracking income tax, but all are functionally related as being for "payroll." Thus, the collected computer system information (collected in block 204) is utilized with this rule to identify these three servers as being functionally related, and thus the software selected by the user should be installed on all three servers, preferably in an automatic manner. That is, even if the user only selected one of the servers, the administration console or service provider will automatically install it on other servers. The same concept applies if the three servers discussed for payroll have the same functionality and software, but are simply backup/redundant systems. The customer-selected software will still be automatically installed on any backup/redundant server.

At run time, the customer receives customized instructions for installing "Program A" on sub-system 308. As shown by instructions 314 in FIG. 3, the customer is provided a reference link (which may be a "hot link") for installing the user-selected "Program A" on the appropriate device (device 312a) in sub-system 308. Note that the only instructions in the GUI 304 are those that are specific for the user-selected program and the user-selected sub-system. As noted above, the user does not need to decide which device is to receive the program, since this has been automatically performed by the software service. Furthermore, the customer sees only germane instructions (those related to installing the selected program), thus avoiding confusion and wasted time/resources that irrelevant instructions would cause.

Note that while the present invention has been described as providing customized software installation instructions, the same process (including collecting computer system information) can be utilized to create customized (and narrowly tailored) instructions for software maintenance, hardware installation, etc. For example, by knowing what type of hardware architecture is being used in a customer's computer system, instructions for installing new hardware can be tailored for the exact system, thus avoiding problems that would result if the installation did not follow specific installation guidelines for that new hardware in that particular existing architecture.

The present invention thus presents a mashup between product documentation and the software configuration data which results in a clear set of instructions based on the details of the systems being manipulated and the task that is being performed. Elements of the mashup include removal of information that is not relevant to the configuration, populating the documentation with values (for example, host names) retrieved from the configuration, and pre-filling forms and worksheets with actual configuration values so that they will be directly usable on the systems.

Thus, as described herein, the present invention provides for both variable replacement as well as instruction filtering based on components discovered during a survey of a computer system. That is, after surveying the computer system, the administration (e.g., installation, maintenance, etc.) instructions are worded to be germane to only the relevant components discovered during the survey of the system. Furthermore, the administration instructions are filtered such that only instructions that are germane to the system are presented to the user.

Note that the flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method comprising:
   collecting, by a software service, computer system information for multiple computer sub-systems used by a customer, wherein the multiple computer sub-systems collectively make up a customer's computer system, and wherein collected computer system information comprises sub-system descriptions of each of the multiple computer sub-systems, software descriptions of all software that is currently residing in each of the multiple computer sub-systems, and hardware descriptions of all hardware that are allocated to each of the multiple computer sub-systems;
   receiving at the software service, from the customer, a new software name of a new software, wherein the new software has been selected by the customer for administration in a user-selected computer sub-system;
   determining, by the software service, which specific device in the user-selected computer sub-system should have the new software administered, wherein determining is based on collected computer system information for the multiple computer sub-systems;
   at run time, replacing variables in administration instructions with a device name for the specific device in which the user-selected computer sub-system should have the new software administered; and
   transmitting the administration instructions with the device name from the software service to the customer.

2. The method of claim 1, wherein the administration instructions are a link to a webpage that provides instructions for installing the new software on the specific device.

3. The method of claim 1, wherein the administration instructions are installation instructions for the new software.

4. The method of claim 3, further comprising:
   automatically providing, to a remote administration console, the device name of the specific device on which the new software has been installed.

5. The method of claim 1, further comprising:
   creating maintenance instructions for the new software, wherein the maintenance instructions are based on the collected computer system information; and
   transmitting the maintenance instructions to the customer.

6. The method of claim 1, wherein the administration instructions are specific for an Operating System (OS) that is currently running on the specific device.

7. The method of claim 1, further comprising:
   creating a rule for identifying devices as being functionally related;
   utilizing the collected computer system information to apply the rule to identify other devices in the customer's computer system that are functionally related to the specific device on which the new software has been installed; and
   automatically installing the new software on the other devices that have been identified as functionally related to the specific device on which the new software has been installed.

8. The method of claim 1, wherein the specific device is identified in the technical instructions.

9. The method of claim 1, further comprising:
   at run time, filtering the administration instructions to contain only instructions that are specific for administering the new software on the specific device.

10. A computer program product comprising:
    a computer readable storage device having computer usable program code embodied therewith, the computer usable program code comprising:
    computer usable program code configured to collect computer system information for multiple computer sub-systems used by a customer, wherein the multiple computer sub-systems collectively make up a customer's computer system, and wherein collected computer system information comprises sub-system descriptions of each of the multiple computer sub-systems, software descriptions of all software that is currently residing in each of multiple computer sub-systems, and hardware descriptions of all hardware that are allocated to each of the multiple computer sub-systems;
    computer usable program code configured to receive, from the customer, a new software name of a new software that is to be installed in a user-selected computer sub-system;
    computer usable program code configured to determine, at a remote software server, which specific device in the user-selected computer sub-system should have the new software installed, wherein determining is based on collected computer system information for the multiple computer sub-systems;
    computer usable program code configured to, at run time, replace variables in installation instructions with a device name for the specific device in which the user-selected computer sub-system should have the new software installed; and
    computer usable program code configured to transmit the installation instructions with the device name to the customer, wherein the technical instructions contain only instructions that are specific for installing the new software on the specific device.

11. The computer program product of claim 10, wherein the installation instructions are a link to a webpage that provides instructions for installing the new software on the specific device.

12. The computer program product of claim 10, further comprising:
    computer usable program code configured to create maintenance instructions for the new software, wherein the maintenance instructions are based on the collected computer system information; and
    computer usable program code configured to transmit the maintenance instructions to the customer.

13. A system comprising:
    a processor;
    a data bus coupled to the processor;
    a memory coupled to the data bus; and
    a computer-usable medium embodying computer program code, the computer program code comprising instructions executable by the processor and configured for customizing technical instructions used by a customer to install software by performing the steps of:

collecting computer system information for multiple computer sub-systems used by a customer, wherein the multiple computer sub-systems collectively make up a customer's computer system, and wherein collected computer system information comprises sub-system descriptions of each of the multiple computer sub-systems, software descriptions of all software that is currently residing in each of the multiple computer sub-systems, and hardware descriptions of all hardware that are allocated to each of the multiple computer sub-systems;

receiving, from the customer, a new software name of a new software that is to be installed in a user-selected computer sub-system;

determining, at a remote software server, which specific device in the user-selected computer sub-system should have the new software installed, wherein determining is based on collected computer system information for the multiple computer sub-systems;

at run time, replacing variables in installation instructions with a device name for the specific device in which the user-selected computer sub-system should have the new software installed; and transmitting the installation instructions with the device name to the customer, wherein the technical instructions contain only instructions that are specific for installing the new software on the specific device.

14. The system of claim 13, wherein the installation instructions are a link to a webpage that provides instructions for installing the new software on the specific device.

15. The system of claim 13, wherein the instructions are further configured for:

creating maintenance instructions for the new software, wherein the maintenance instructions are based on the collected computer system information; and transmitting the maintenance instructions to the customer.

* * * * *